United States Patent [19]

Krishnakumar et al.

[11] Patent Number: 4,990,301

[45] Date of Patent: Feb. 5, 1991

[54] METHOD AND APPARATUS FOR INJECTION MOLDING OF MULTILAYER PREFORMS

[75] Inventors: Suppayan M. Krishnakumar, Nashua; Wayne N. Collette, Merrimack; Thomas E. Nahill, Amherst, all of N.H.

[73] Assignee: Continental PET Technologies, Inc., Norwalk, Conn.

[21] Appl. No.: 301,066

[22] Filed: Jan. 25, 1989

[51] Int. Cl.$^5$ .............................................. B29C 45/16
[52] U.S. Cl. ................................... 264/513; 264/245; 264/255; 264/328.12; 425/130; 425/533
[58] Field of Search ............ 264/513, 255, 328.8, 264/328.12, 245; 425/130, 133.1, 533, 577, 129.1

[56] References Cited

U.S. PATENT DOCUMENTS

| | | | |
|---|---|---|---|
| 4,052,497 | 11/1977 | Monnet | 264/255 |
| 4,525,134 | 6/1985 | McHenry et al. | 264/513 |
| 4,657,596 | 4/1987 | Ozeki et al. | 264/328.8 |
| 4,798,697 | 1/1989 | Nohara et al. | 264/255 |

FOREIGN PATENT DOCUMENTS

| | | | |
|---|---|---|---|
| 61-219644 | 9/1986 | Japan | 264/513 |
| 63-55 | 1/1988 | Japan | 264/328.8 |
| 63-252705 | 10/1988 | Japan | 425/130 |
| 88/00117 | 1/1988 | PCT Int'l Appl. | 425/130 |

Primary Examiner—Jill L. Heitbrink
Attorney, Agent, or Firm—Charles E. Brown; Paul Shapiro; Charles A. Brown

[57] ABSTRACT

A method of and apparatus for forming multiple layer preforms wherein the various layers may be varied as to number, material, thickness and position in the preform by controlling the injection of the specific materials as to timing, quantity and rate of delivery. Most specifically, a featured aspect is the ability to simultaneously deliver to an injection nozzle and through such injection nozzle into a preform mold cavity two or more molten plastic materials simultaneously. This is possible by way of a multiple gate nozzle and a plurality of separately operable metering pots all controlled by way of a timing device. The timing device may also control the rate of the dispensing an individual material from each of the metering pots.

31 Claims, 6 Drawing Sheets

METHOD AND APPARATUS FOR INJECTION MOLDING OF MULTILAYER PREFORMS

This invention relates in general to new and useful improvements in the formation by injection molding of preforms formed of plastic materials for use in the blow molding of multilayer containers.

Plastic material preforms and containers blow molded from such preforms are well known. It is also well known to form preforms of a multilayer construction which may include one or more barrier layers. Such preforms and modes of making the same are disclosed, for example, in the patent to Krishnakumar et al U.S. Pat. No. 4,609,516 granted Sept. 2, 1986 and Beck U.S. Pat. No. 4,550,043 granted Oct. 29, 1985. Further, it is known to provide apparatus for the injection molding of preforms wherein there are provided a plurality of metering pots and an injection nozzle which is provided with a plurality of coaxial flow passages, each nozzle passage having a separate gate controlled by a common gate pin.

This invention most particularly relates to the injection molding of preforms utilizing multiple materials and wherein in order to control the relative thickness and positions of layers within the interior of the preform, plastic materials are injected both sequentially and/or simultaneously into the preform cavity.

With the above and other objects in view that will hereinafter appear, the nature of the invention will be more clearly understood by reference to the following detailed description, the appended claims, and the several views illustrated in the accompanying drawings.

FIG. 7 is a schematic sectional view showing an injection arrangement similar to FIG. 6A but wherein there is a second injection of a secondary material.

Figure 1:
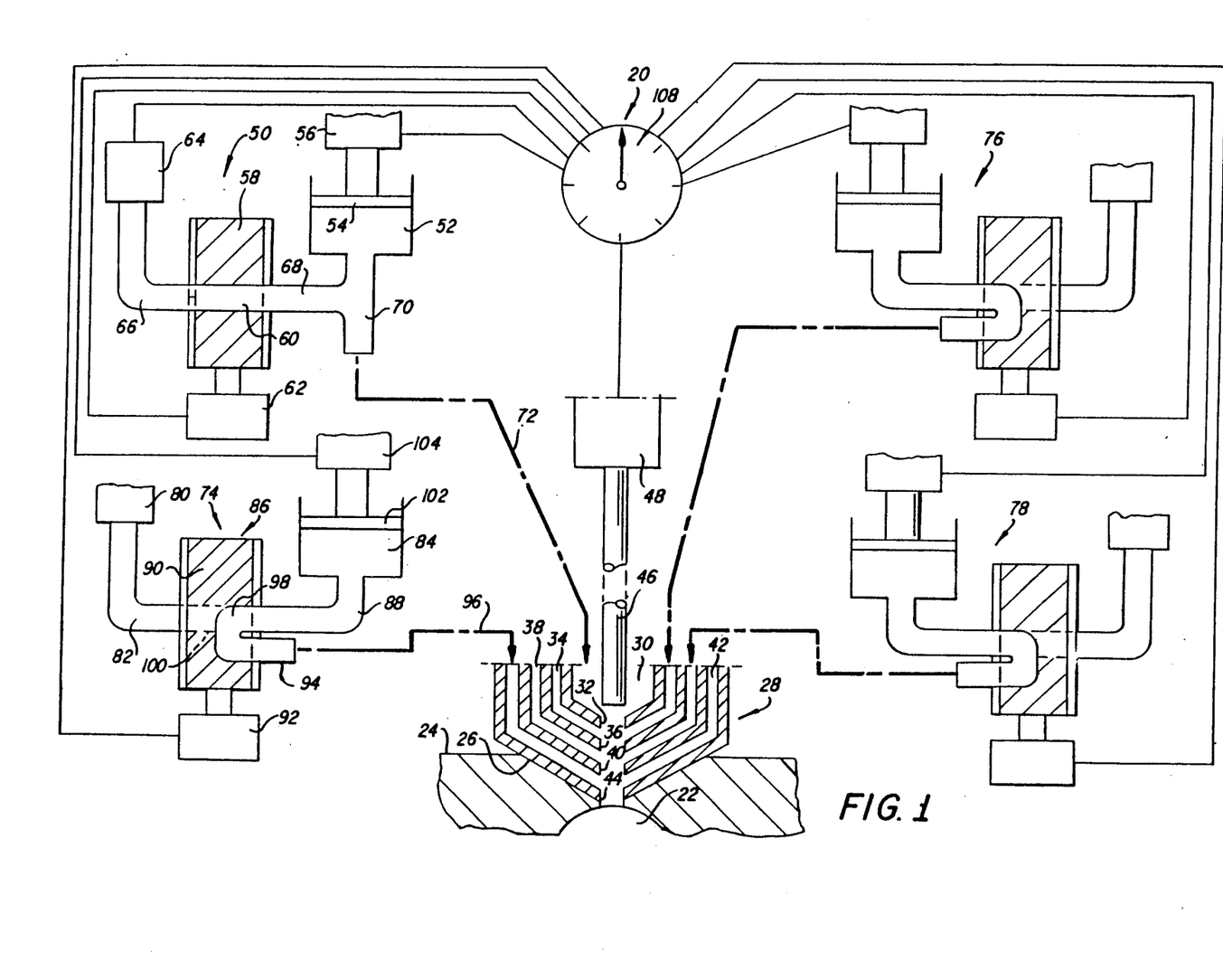
FIG. 1 is a schematic showing of the apparatus for injecting as many as four plastic materials into a single mold cavity.

Referring now to the drawings in detail, reference is first made to FIG. 1 wherein there is illustrated an injection manifold system formed in accordance with this invention. The system being generally identified by the numeral 20. First of all, it is pointed out that the system 20 is illustrated in conjunction with only a single cavity 22 within which there is injected plural plastic material to form a multilayer preform. However, the invention is applicable to a multiple cavity mold arrangement.

The mold cavity 22 is formed within a mold 24 which is provided with an opening 26 into the cavity in which there is seated in sealed relation a multi-passage nozzle generally identified by the numeral 28. In the illustrated embodiment of the nozzle 28, there are four flow passages. However, the number may be more or less as so desired. Further, as will be apparent hereinafter, at times only two of the nozzle passages will be utilized.

The illustrated nozzle 28 includes a central passage 30 which is provided with a gate 32 for controlling the flow of plastic material therethrough. The nozzle 28 next includes a first outer passage 34 which is concentric or coaxial with the passage 30 and is provided with a flow control gate 36. The passage 34 is intended to receive a second or secondary material.

Surrounding the flow passage 34 is a second outer flow passage 38 which is concentric or coaxial with the passages 30, 34 and which is provided with a flow control gate 40. A third material is to be injected through the passage 38 although this third material may be identical with either the primary material or the secondary material.

Finally, the nozzle 28 includes a third outer passage 42 which surrounds the passage 38 and which is provided with a flow control gate 44. The surrounding passage 42 is concentric or coaxial with the passages 30, 34, 38.

The gates 32, 36, 40, 44 are selectively closed in sequence by a gate pin 46 which is positioned by means of a positioning devide 48 which is automatically controlled.

In accordance with the invention, a primary material is directed into the nozzle 28 by a first apparatus generally identified by the numeral 50. The apparatus 50 includes a metering pot 52 having therein a movable piston 54 whose position and rate of movement is controlled by an actuator 56. Molten plastic material is diverted into the metering pot 52 by way of a spool valve 56 having a spool 58 which is preferably rotatable, but which may be of the axially movable type. The spool 58 has a transverse flow passage 60 and the spool 58 is selectively positioned by means of a control device 62. The flowable plastic material is delivered to the metering pot 52 from a supply 64 which may be in the form of an extruder through a supply passage 66 which is coupled to the spool valve 56. Molten plastic material flowing through the spool valve 56 enters into a passage 68 which, in turn, is coupled to a passage 70 which is in communication with the interior of the metering pot 52.

It will be seen that the injection device 50 may supply molten plastic material to the nozzle 28 either from the metering pot 52 or directly from the extruder 64. In general operation, with the gate 32 closed, and the valve 56 operable, molten plastic material is directed into the metering pot 52 by the extruder 64 either as the piston 54 is retracted, or after it is retracted. With the metering pot 52 filled with molten plastic material, a primary material may be directed into the nozzle 28 through a flow passage 72 which forms a communication of the passage 70 by either advancing the piston 54 to empty the metering pot 52 or by utilizing the extruder 64. Further, with the piston 34 fully advanced and the valve 56 in its open position, a primary material may be directed into the passage 30 slowly from the extruder 64 when the valve 56 is open. Flow through the nozzile 28 into the preform cavity 22 is controlled by the gate 32.

Other flowable molten plastic materials are selectively directed into the flow passages 34, 38 and 42 from other injection devices identified by the numerals 74, 76 and 78 which may be identical in construction as shown, but of different sizes depending upon the quantity of molten plastic material which is to be injected into the preform mold cavity 22

Each of the devices 74, 76 and 78 includes a molten plastic supply 80 which may be in the form of an extruder although not necessarily so. The supply 80 is coupled by means of a flow passage 82 to a metering pot 84 through a spool valve 86 and a flow passage 88. The spool valve 86 is provided with a spool 90 which is illustrated as being rotatable and which is provided with a positioning device 92. The spool valve 86 is provided with a discharge passage 94 which is directed into a passage 96 which is coupled to a selective one of the passages of the nozzle 28. The spool 90 is provided with a reversely turned flow passage 98 and a through passage 100 in addition to having a closed position. In operation, the respective metering pot 84, with a piston 102 thereof retracted a selective distance by means of a control device 104 is filled by positioning the metering valve 74 in its through position and supplying molten plastic material from the supply 80. Then the spool 90 is rotated to its closed position. When it is desired to dispense the molten plastic material from the metering pot 84 the spool 90 is rotated to the illustrated position wherein molten plastic material may be directed from the metering pot 84 into that one of the several passages of the nozzle 28 to which the discharge passage 94 is connected.

A principal feature of this invention is that as opposed to the prior practice of delivering molten plastic material to the nozzle 28 in sequence, the apparatus 20 may be operated so as to simultaneously supply to and through the nozzle 28 two or more of the molten plastic materials. By simultaneously injecting two or more molten plastic materials into the preform mold cavity 22, not only may a multilayer preform be formed, but also the position of an intermediate and core layer or two separate intermediate layers may be readily controlled as will be more particularly defined hereinafter.

Figure 2A:
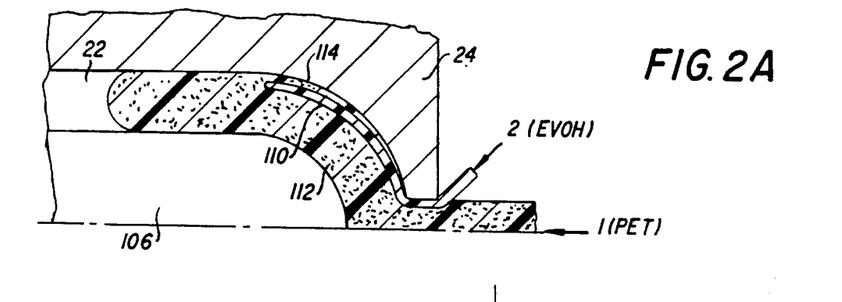
FIG. 2A is a schematic sectional view through a mold cavity showing the injection of two materials into the mold cavity.
Figures 2B, 3A:
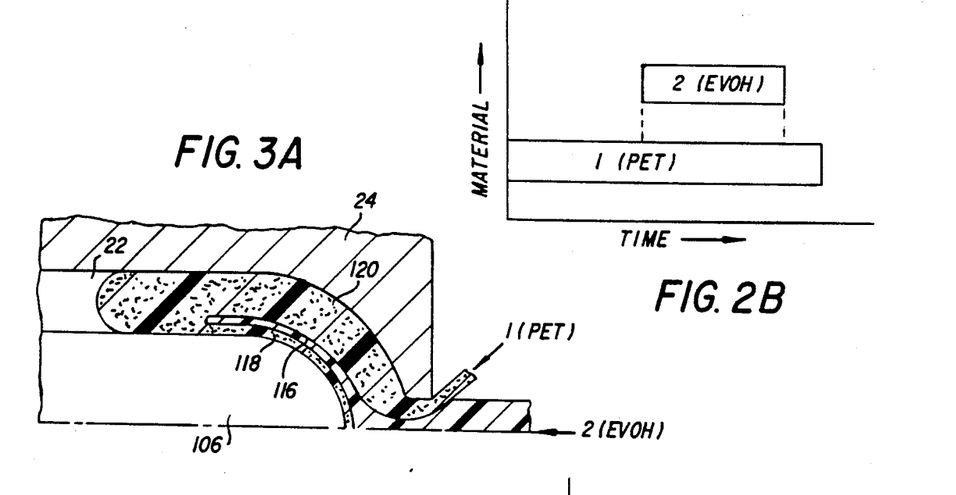
FIG. 2B is a timing diagram of the injection of plastic materials as shown in FIG. 2A.
FIG. 3A is another schematic sectional view similar to FIG. 2A showing a different arrangement of injection of two plastic materials.

Reference is next made to FIGS. 2A, 2B wherein there is illustrated a method of forming a two material, three layer preform within the preform mold cavity 22 and about a mold core 106 conventionally positioned within the mold cavity 22.

In the illustrated method of injection molding a preform as shown in FIG. 2A, the supply passage 72 is coupled to the central passage 30 of the nozzle 28 while a second of the molten material supply devices is coupled to one of the surrounding passages of the nozzle 28.

Flow of plastic material is controlled by a timing device generally identified by the numeral 108 and which controls the timed sequence operation of the various controls of the injection manifold assembly 20.

As is clearly shown in FIGS. 2A and 2B, a primary material is directed into the mold cavity for the full time of the injection of molten plastic material to form a preform. In the case of the primary material, this may be effected by controlling the flow rate of the primary plastic material from the extruder 64 or by controlling the rate of supply of the primary material by the metering pot 52.

At a selected stage during the injection of the primary material, a secondary material is injected into the preform mold cavity 22 from one of the surrounding passages of the nozzle 28. The injection of the secondary material is simultaneous with the injection of the primary material and is at a selected controlled rate with a selected beginning time and ending time. The relative rates of the injections of the two materials is such that the secondary material appears as a relatively thin layer 110 which is positioned adjacent the exterior of the preform which is being molded. The resultant preform is a two material, three layer preform with the primary material forming a relatively thick inner layer 112 and a relatively thin outer layer 114.

Figures 3B, 4A:
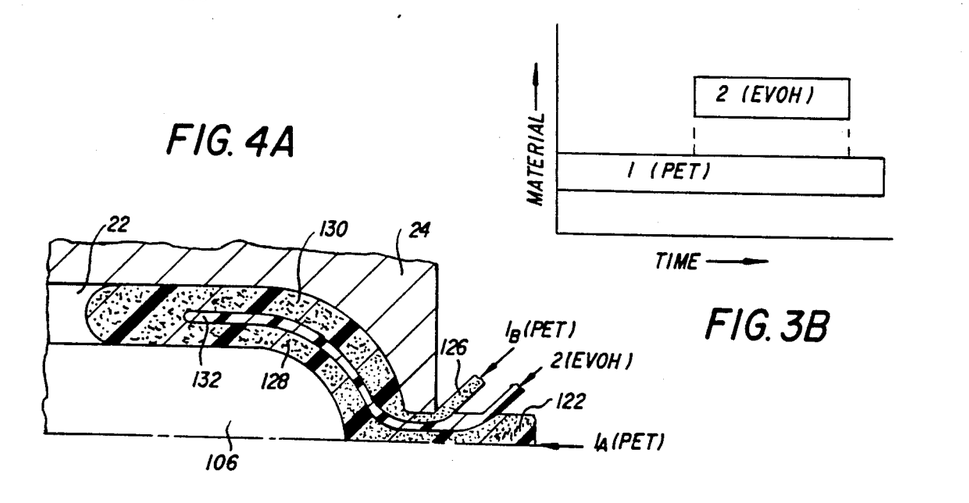
FIG. 3B is a timing diagram for the injection of plastic materials in accordance with FIG. 3A.
FIG. 4A is a schematic sectional view similar to FIG. 2A with there being three separate injections of materials into the mold cavity.

Reference is now made to FIGS. 3A and 3B wherein once again the primary material is injected for the full time of injection molding the preform, but wherein the secondary material is injected only during a selected portion of the injection time of the primary material but simultaneously therewith. It is to be noted that the timing of FIG. 3B is the same as that of FIG. 2B.

However, it will be seen that the primary material, instead of being directed into the cavity 22 through the central passage 30 of the nozzle 28, is injected into the cavity through one of the surrounding passages. On the other hand, the secondary material is injected into the cavity 22 through the central passage 30 to form a relatively thin inwardly offset layer 116 and dividing the preform into a relatively thin inner layer 118 and a relatively thick outer layer 120. The net result is a two material, three layer preform wherein the internal layer is offset towards the interior of the preform as opposed to being offset towards the exterior of the preform in accordance with the method of FIG. 2A.

Figure 4B:
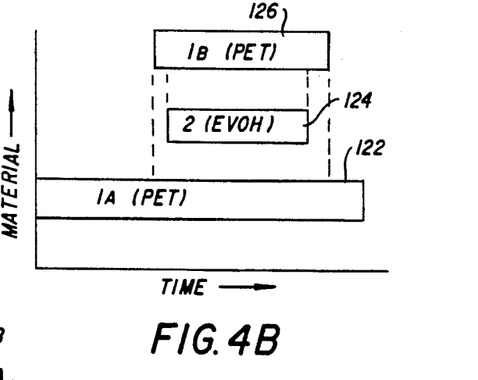
FIG. 4B is a timing diagram for the injection of FIG. 4A.

Referring now to FIGS. 4A and 4B, it will be seen that once again there is being formed a preform of two materials and having three layers. However, in this instance instead of the intermediate layer being offset as in the cases of FIGS. 2A and 3A, it is centered. Further, this is effected by three separate injections of material.

As in the cases of the injection method of FIGS. 2A and 3A, the primary material is continuously injected with the injection being by way of the center passage 30 as st 122. Then the secondary material is injected as at 124 through one of the surrounding passages and more of the primary material is separately injected through another and outer surrounding passage as at 126. The net result is the primary material appears as an inner layer 128 and an outer layer 130 while the secondary material appears as a centrally located intermediate layer 132.

Referring now to FIG. 4B, it will be seen that the secondary material is injected as at 124 simultaneous with both injections of the primary material and wherein the injection of the primary material at 126 begins ahead of and continues after the injection of the secondary material 124.

Figure 5A:
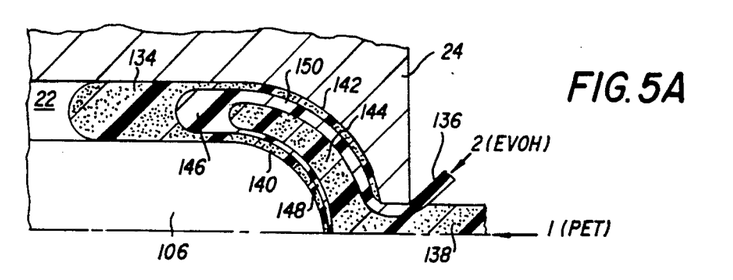
FIG. 5A is another schematic sectional view similar to FIG. 2A with the injection of a primary material being interrupted.
Figure 5B:
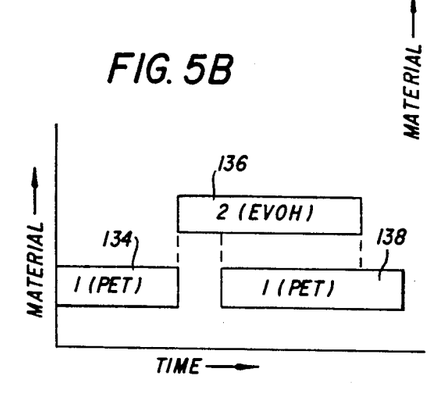
FIG. 5B is a timing diagram for the injection of FIG. 5A.

Reference is now made to the injection method of FIG. 5A and the timing diagram of FIG. 5B. It will be seen that the primary material is injected first as at 134 through the central nozzle passage 30. This injection is discontinued and injection of the second material 136 begins. The second material 136 is injected through one of the surrounding passages of the nozzle.

At this time it is pointed out that while the timing diagram of FIG. 5B shows the initiation of the injection of the second material 136 at the instant the initial injection of the primary material discontinues, it is to be understood that there may be a slight separation or a minor overlap without materially imparing the injection process.

It is to be noted that after a short delay, the primary material is again delivered through the nozzle 28 and that delivery continues until the end of the injection. It will be seen that there is an overlap of the second injection of primary material 138 and the injection of the secondary material with the injection of the secondary material discontinuing before the final injection of the primary material.

The net result of this injection method is shown in FIG. 5A wherein the injection of the second material 136 divides the preform into an inner layer 140 and an outer layer 142 and the second injection of the primary material appears as a core 144 in the intermediate layer 146 formed by the secondary material with the intermediate layer 146 being divided into a relatively narrow intermediate layer 148 and a relatively wide intermediate layer 150.

The net result is a two material, five layer preform construction.

Figure 6A:
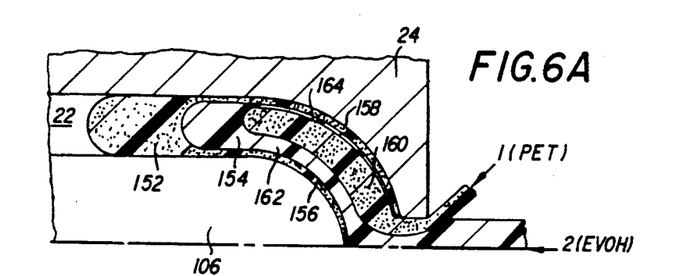
FIG. 6A is a schematic sectional view similar to FIG. 5A with the location of injections of the two materials being reversed.

Reference is now made to FIG. 6A wherein it will be seen that the secondary material is injected into the preform cavity 22 through the central passage of the nozzle 28 while the primary material is delivered through one of the surrounding passages. Further, it will be seen that the sequence of injection of the primary material and the secondary material is the same as that of FIG. 6B with the injection of the primary material being interrupted.

The first injected primary material 152 is the first within the preform cavity 22 with the secondary material 154 dividing the primary material 152 to form relatively thin inner layer 156 and outer layer 158.

The second delivered primary material, identified by the numeral 160 and being injected through one of the surrounding passages, appears as a core within the secondary material with the core being outwardly offset so as to define in the secondary material, which functions as an intermediate layer, a relatively thick intermediate layer 162 and a relatively thin outer intermediate layer 164.

Once again the preform will be of a two material, five layer construction.

Figures 7A, 7B, 8A:
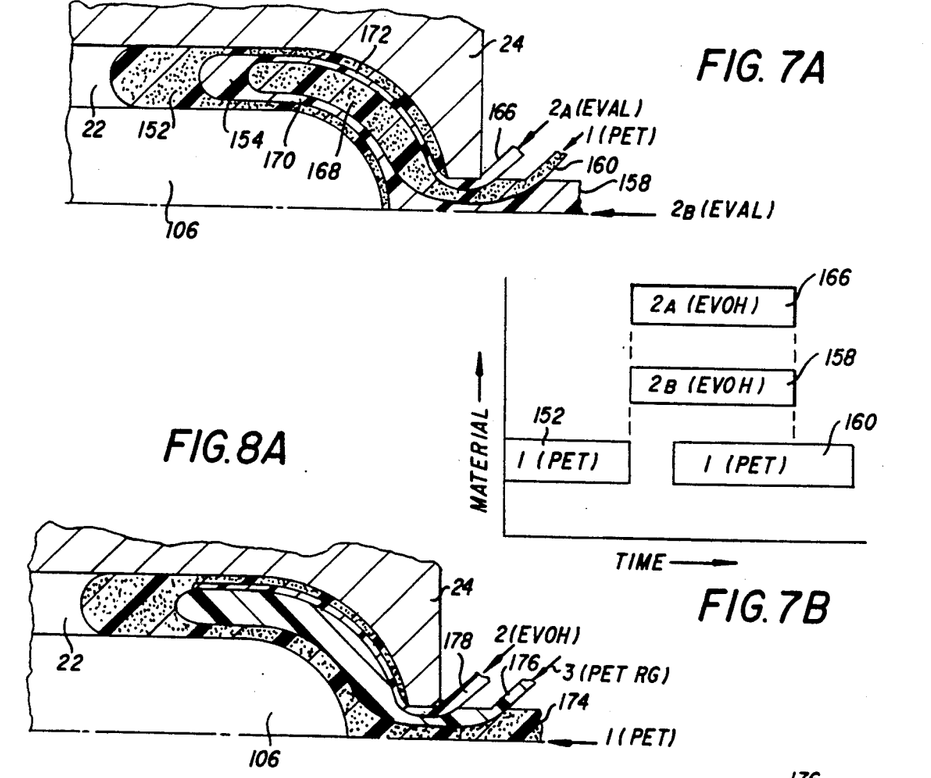
FIG. 7B is a timing diagram for the injection sequence of FIG. 7A.
FIG. 8A is a schematic sectional view showing the injection of three different materials into a preform cavity to provide a four layer structure.

A further two material, five layer preform construction is found in FIG. 7A. However, there are two separate injections of the secondary material with there being a second injection of secondary material as at 166 through another and outer surrounding nozzle passage.

Figure 6B:
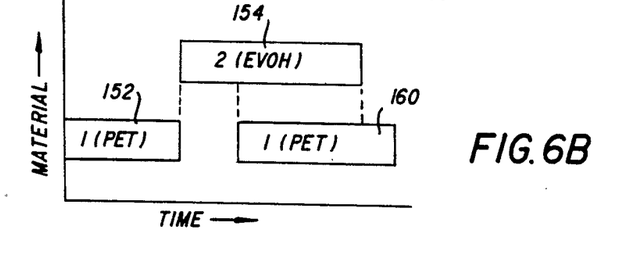
FIG. 6B is a timing diagram for the injection of FIG. 6A.

FIG. 7B shows that the injection of the different materials in accordance with FIG. 7A is the same as that of FIG. 6B except for the additional injection of the secondary material 166. It is also to be noted that the second injection of the secondary material occurs at the same time as the first injection of the secondary material.

The net result is that the second injection 160 of the primary material appears as a central core 168 within the intermediate layer 154 with the intermediate layer 154 having on opposite sides of the core 168 generally like thickness in a intermediate layer 170 and outer intermediate layer 172.

In all of the foregoing embodiments of the invention, only two materials are involved. In a preferred embodiment of the invention, the primary material will preferably be a polyester, such as PET, and the secondary material will be a barrier material such as EVOH. It is to be understood, however, that the specific materials involved are known and of themselves do not form a part of this invention.

Referring now to FIG. 8A, it will be seen that there is illustrated a method of making a three material, four layer preform by continuously injecting into the mold cavity 22 through the central passage 30 of the nozzle 28 a primary material 174 together with during part of the injection of the primary material 174 injecting a third material 176 and a secondary material 178 through surrounding ones of the passages of the nozzle 28. The net result is that the preform is primarily formed of the primary material 174 and is provided with a relatively thick inner intermediate layer of the third material 176 and a thin outer layer of the secondary material 178.

Figures 8B, 9A:
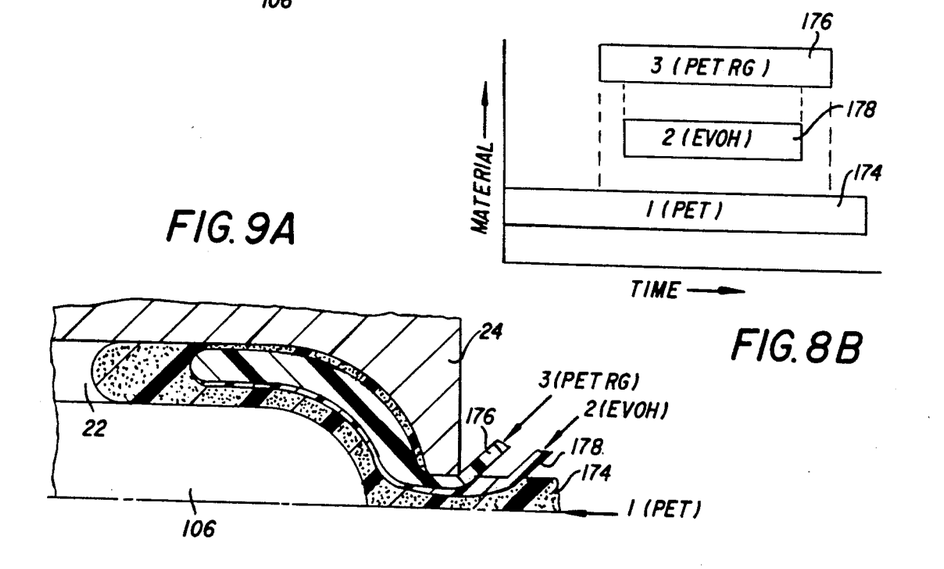
FIG. 8B is a timing diagram for the injection of FIG. 8A.
FIG. 9A is a schematic sectional view similar to FIG. 8A but wherein the injection location of two outer materials is reversed from that of FIG. 8A.

Referring now to FIG. 8B, it will be seen that while the primary material 174 is continuously injected into the mold cavity 122, the third material 176 is injected into the mold cavity only during the intermediate portion of the injection of the primary material 174, but simultaneously therewith. Further, it will be seen that the secondary material 178, while the injection thereof is also continuous, but for a short period, is initially injected only after the third material 176 has been injected for a while and the injection thereof is discontinued in advance of the discontinuation of the injection of the third material 176. It will be appreciated that for a period of time all three materials will be simultaneously injected.

Reference is now made to FIG. 9A wherein there is illustrated the method of making still a different three material, four layer preform. In this instance, the primary material 174 is again injected through the central passage 30 of the nozzle 28 and the injection is continuous. The method differs, however, in that the secondary material 178 is injected into the preform mold 22 through an inner one of the surrounding passages while the third material 176 is injected through an outer one of the surrounding passages of the nozzle 28. The net result is that the positions of the two intermediate layers is reversed so that the layer of the secondary material is disposed inwardly of the layer of the third material.

Figure 9B:
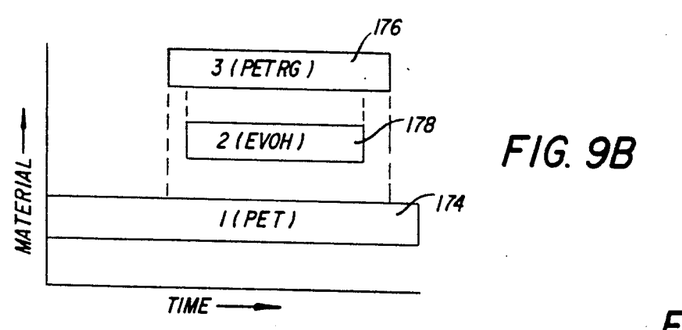
FIG. 9B is a timing sequence for the injection of FIG. 9A.

Referring now to FIG. 9B, it will be seen that the timing sequence is the same as that of FIG. 8B.

Figure 10A:
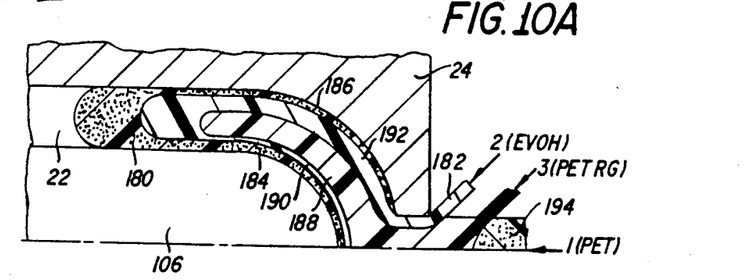
FIG. 10A is a schematic sectional view similar to FIG. 9A but wherein the injection of a primary material is interrupted and the timing of injection of two of the materials is varied so as to provide a five layer construction.

Reference is now made to FIG. 10A wherein there is illustrated a method of forming a three material, five layer preform. As will be seen from FIG. 10B, there is an initial injection of a primary material 180 with this injection being through the central passage 30 of the nozzle 28. Next, there is injected a quantity of secondary material 182 through an outer surrounding passage of the nozzle 28 which separates the primary material 180 into two relatively thin layers, an inner layer 184 and an outer layer 186. Then, simultaneously with the injection of the secondary material, a third material 188 is injected through an inner one of the surrounding passages of the nozzle 28 to form a core within the secondary material 182 and dividing the secondary material 182 into a relatively thin inner intermediate layer 190 and a relatively thick outer intermediate layer 192. This is followed by a final injection of more of the primary material as at 194 through the central nozzle passage 30 to fill the mold cavity 22.

Returning to FIG. 10B, it will be seen that when the injection of the primary material 180 is discontinued, injection of the secondary material 182 begins and this is followed by the simultaneous injection of the third material 188. It is also to be noted that the injection of the secondary material 182 is discontinued in advance of the discontinuation of the injection of the third material 188. It is also to be noted that when the injection of the third material 188 is discontinued, the injection of the primary material 194 begins. Once again, there may either be a slight overlap of the injection of the primary material with the other material or a slight gap in the injection cycle.

Figure 10B:
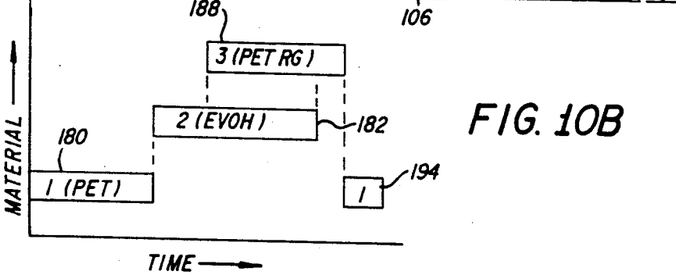
FIG. 10B is a timing diagram for the injection sequence of FIG. 10A.
Figure 11A:
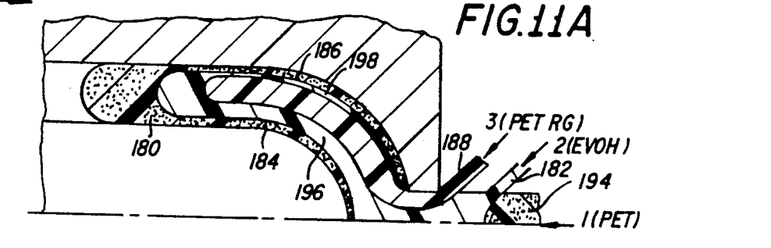
FIG. 11A is a schematic sectional view similar to FIG. 10A but wherein the location of the injections of second and third materials is reversed.
Figure 11B:
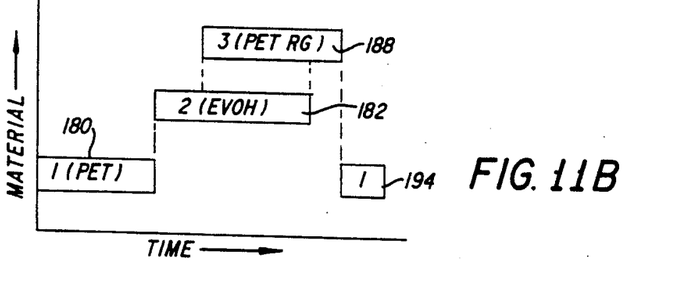
FIG. 11B is a timing diagram for the injection of FIG. 11A.

Referring now to FIGS. 11A and 11B, it will be seen that there is disclosed a method of making another three material, five layer preform with the same timing of injection of the three materials as in FIG. 10B, but wherein the secondary material is injected through an inner one of the surrounding passages while the third material is injected through an outer one of the surrounding passages of the nozzle 28. The net result is that, as in FIG. 10A, the secondary material 182 forms a relatively thick intermediate layer dividing the primary material 180 into the relatively thin inner layer 184 and outer layer 186. The third material 188 once again forms a core within the intermediate layer and divides the intermediate layer into a relatively thick inner intermediate layer 196 and a relatively thin outer intermediate layer 198. It will thus be seen that the difference between the preform of FIG. 10A and that of FIG. 11A is that the core in FIG. 10A is offset inwardly while in the preform of FIG. 11A the core is offset outwardly.

In the embodiments of FIGS. 10A and 11A, the primary material and the secondary material will preferably be those described here and above with respect to the other embodiments. The third material will preferably be reground PET although as far as the method of this invention is concerned, it may be any suitable core forming material.

Figure 12A:
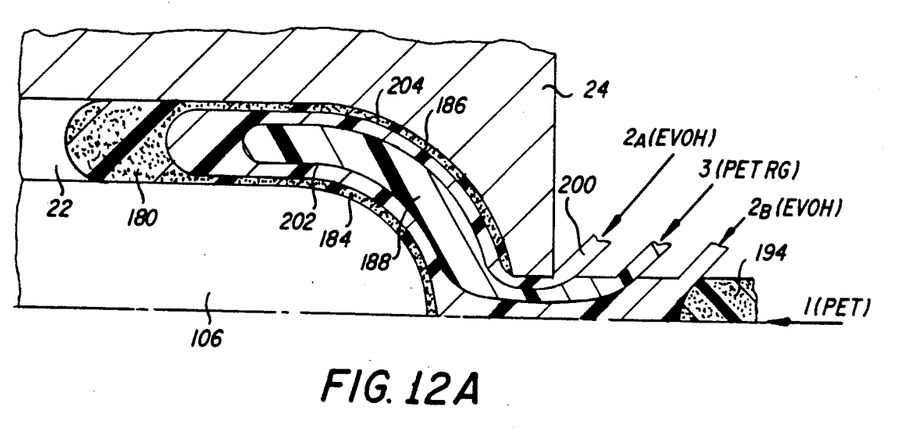
FIG. 12A is a schematic sectional view similar to FIG. 10A but wherein there is four separate injections of material.
Figure 12B:
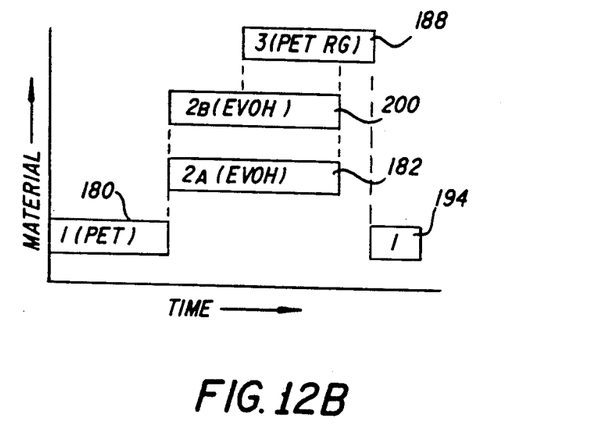
FIG. 12B is a timing diagram for the injection of FIG. 12A.

Referring now to FIG. 12A, it will be seen that there is illustrated a method of forming a three material, five layer preform. This is accomplished generally in the same manner as that shown in FIG. 11A with the exception that there is a second injection of the secondary material, identified by the numeral 200 through an outermost one of the surrounding passages of the nozzle 28. As is clearly shown in FIG. 12B, the two injections of the secondary material are simultaneous.

It will be seen that the injection of the primary material 200 tends to crowd the core 188 formed by the third material in FIG. 11A inwardly so that the intermediate layer of the secondary material is divided into an inner intermediate layer 202 and an outer intermediate layer 204 of substantially the same thickness.

The three materials utilized in forming the preform of FIG. 12A will preferably be the same as those described above with respect to FIGS. 10A and 11A.

At this time it is particularly pointed out that the relationship of the various layers of the individual preforms is controlled not only by the timing of the timing diagrams, but also by the quantity of the injected material and the rate of injection which is controlled by the various metering pots as to size and rate of movement of their relative pistons. Flow of the various materials into the mold cavity 22 will, of course, be controlled by the gate pin 46 in conjection with the various gates while the positions of the various valves will control those materials which are directed to the nozzle 28 under pressure at any particular time. It is also to be understood that the extruder 64 may be utilized to complete the filling of the preform mold cavity 22 as, for example, in the case of the second injection of the primary material as at 194.

It is further particularly pointed out that while certain connections are illustrated in FIG. 1 between the various metering pots and various ones of the passages of the nozzle 28, these connections may be varied in different installations as is apparent from the various injections of the different materials through different passages of the nozzle 28.

Layer Structures (a) 2 materials, 3 layers Example—PET/EVOH/PET
 FIG. 2 EVOH closer to outer PET
 FIG. 3 EVOH closer to inner PET
 FIG. 4 EVOH at center of PET (b) 3 materials, 5 layers Example—PET/EVOH/PET/EVOH/PET
 FIG. 5 Inner EVOH thinner than outer EVOH
 FIG. 6 Inner EVOH thicker than outer EVOH
 FIG. 7 Equal inner and outer EVOH thickness (c) 3 materials, 4 layers Example—PET/PET regrind/EVOH/PET
 FIG. 8 Inner PET/PET RG/EVOH/PET
 FIG. 9 Inner PET/EVOH/PET RG/PET (d) 3 materials, 5 layers Example—PET/EVOH/PET regrind/EVOH/PET
 FIG. 10 Inner EVOH thinner than outer EVOH
 FIG. 11 Inner EVOH thicker than outer EVOH
 FIG. 12 Equal inner and outer EVOH thickness

TABLE 1

| Layer Structure | Layer Thickness (mils) | | | | |
|---|---|---|---|---|---|
| | 1* | 2 | 3 | 4 | 5 |
| FIG. 2-2M3L | 20–40 | 5–30 | 80–125 | | |
| FIG. 3-2M3L | 80–125 | 5–30 | 20–40 | | |
| FIG. 4-2M3L | 60–70 | 5–30 | 60–70 | | |
| FIG. 5-2M5L | 20–40 | 5–30 | 30–105 | 1–10 | 20–40 |
| FIG. 6-2M5L | 20–40 | 1–10 | 30–105 | 5–30 | 20–40 |
| FIG. 7-2M3L | 20–40 | 5–30 | 30–90 | 5–30 | 20–40 |
| FIG. 8-3M4L | 20–40 | 5–30 | 30–105 | 20–60 | |
| FIG. 9-3M4L | 20–60 | 30–105 | 5–30 | 20–40 | |
| FIG. 10-3M5L | 20–40 | 5–30 | 30–105 | 1–10 | 20–40 |
| FIG. 11-3M5L | 20–40 | 1–10 | 30–105 | 5–30 | 20–40 |
| FIG. 12-3M5L | 20–40 | 5–30 | 30–105 | 5–30 | 20–40 |

*Outside layer of preform

Table 1 shows range of layer thickness for a 0.150 inch thick preform.

Although a number of typical preform laminations have been specifically illustrated and described herein, it is to be understood that these are given only by way of examples and that the number of preform layers may be varied as to positions, numbers and materials without departing from the spirit and scope of the invention as defined by the appended claims.

We claim:

1. A method of injection molding multiple layer multiple material plastic preforms to be blow molded into biaxially oriented containers, said method comprising the steps of providing a multiple passage coxial nozzle and supply means for separately supplying different materials to selective ones of said nozzle passages, said method including the step of utilizing said nozzle and said supply means to separately and simultaneously inject the several plastic materials into an injection mold for a container preform, said nozzle being provided with a central passage and at least one surrounding passage converging on said central passage, a primary material is injected through one of said passages, and a secondary material being simultaneously injected through the other of said passages during a portion of the time said first material is being injected wherein said second material forms an intermediate layer between two layers of said primary material in a selected portion of said preform, said two layers of said primary material being directed through said central passage and said secondary material being directed through said surrounding passage to form said intermediate layer positioned off center in said preform towards an exterior of said preform.

2. A method of injection molding multiple layer multiple material plastic preforms to be blow molded into biaxially oriented containers, said method comprising the steps of providing a multiple passage coaxial nozzle and supply means for separately supplying different materials to selective ones of said nozzle passages, said method including the step of utilizing said nozzle and said supply means to separately and simultaneously inject the several plastic materials into an injection mold for a container preform, said nozzle being provided with a central passage and at least one surrounding passage converging on said central passage, a primary material is injected through one of said passages to form inner and outer layers, and a secondary material being simultaneously injected through the other of said passages during a portion of the time said first material is being injected wherein said second material forms an intermediate layer between said two layers of said primary material in a selected portion of said preform, a second surrounding passage surrounding the first mentioned surrounding passage, and a third plastic material being injected through said second surrounding passage.

3. A method according to claim 2 wherein said third material is the same material as said primary material.

4. A method according to claim 2 wherein all three of said materials are at least in part simultaneously injected.

5. A method according to claim 2 wherein injection time of said three materials are different and there is a complete overlap of injection times from the shortest to the longest.

6. A method according to claim 2 wherein said third material is the same material as said primary material, the second material is delivered through said first surrounding passage and forms said intermediate layer which is centered in said preform.

7. A method according to claim 2 wherein said third material is delivered only during the delivery of said primary material and said secondary material.

8. The method of claim 7 wherein timing of said material delivery is one wherein the secondary material forms generally a core layer directing said primary material into inner and outer layers, and said third material forms a separate layer between said outer layer and said core.

9. A method according to claim 2 wherein said second material is delivered only during the delivery of said primary material and said third material.

10. The method of claim 9 wherein the timing and quantities of delivery of said materials is one wherein the secondary material forms a thin layer within said primary material, and said third material forms a thicker layer between said secondary material and an outer layer of said primary material.

11. A method according to claim 2 wherein the injection of said primary material is stopped.

12. A method according to claim 2 wherein the injection of said primary material is interrupted, and injection of the secondary material and the third material occurs primarily during said stopped.

13. A method according to claim 12 wherein the timing and volumes of the deliveries of said three materials is one wherein said third material separates said primary material into inner and outer layers and said secondary material forms a core layer dividing the third material into inner and outer intermediate layers.

14. A method according to claim 13 wherein the injection of said secondary material from within said third material results in the inward offsetting of said third material within said secondary material.

15. A method according to claim 12 wherein the timing and volumes of the deliveries of said three materials is one wherein said secondary material separates said primary material into inner and outer layers and said third material forms a core layer dividing said secondary material into inner and outer intermediate layers.

16. A method according to claim 15 wherein the injection of said third material from outside of said secondary material results in the outward offsetting of said third material within said secondary material.

17. A method according to claim 2 wherein a third surrounding passage surrounding said second surrounding passage is provided, and a fourth material is injected through said third surrounding passage.

18. A method according to claim 17 wherein the injection of said primary material is stopped.

19. A method according to claim 18 wherein the injection of said primary material is stopped but occurs at both a start and an end of the injection.

20. A method according to claim 17 wherein the injection of said primary material is stopped, and injection of said secondary, third and fourth material occurs primarily during said interruption.

21. A method according to claim 17 wherein the timing and volumes of the deliveries of said four materials is one wherein said secondary and fourth materials are the same and join to form an intermediate layer directing said primary material into inner and outer layers, and said third material forms a core layer within said intermediate layer.

22. A method according to claim 21 wherein the delivery of the third material between the secondary and fourth materials results in said intermediate layer being centered in said primary material and said third material being centered relative to said intermediate layer.

23. A method of injection molding multiple layer multiple material plastic preforms to be blow molded into biaxially oriented containers, said method comprising the steps of providing a multiple passage coaxial nozzle and supply means for separately supplying different materials to selective ones of said nozzle passages, said method including the step of utilizing said nozzle and said supply means to separately and simultaneously inject the several plastic materials into an injection mold for a container preform, said nozzle being provided with a central passage and at least one surrounding passage converging on said central passage, a primary material is injected through one of said passages to form inner and outer layers, and a secondary material being simultaneously injected through the other of said passages during a portion of the time said first material is being injected wherein said second material forms an intermediate layer between said two layers of said primary material in a selected portion of said preform, injection of said primary material being stopped but occurring at both a start and an end of the injection, injection of said second material occurs both during the absence of injection of said primary material and simultaneous with the second injection of said primary material.

24. A method according to claim 23 wherein the second material appears in the preform as inner and outer intermediate layers between inner and outer layers of said primary material, and a second injected primary material forms a core layer between said inner and outer intermediate layers.

25. A method according to claim 24 wherein said outer intermediate layer is formed to have a greater thickness than said inner intermediate layer.

26. A method of injection molding multiple layer multiple material plastic preforms to be blow molded into biaxially oriented containers, said method comprising the steps of providing a multiple passage coaxial nozzle and supply means for separately supply different materials to selective ones of said nozzle passages, said method including the step of utilizing said nozzle and said supply means to separately and simultaneously inject the several plastic materials in an injection mold for a container preform, said nozzle being provided with a central passage and at least one surrounding passage converging on said central passage, a primary material is injected through one of said passage to form inner and outer layers, and a secondary material being simultaneously injected through the other of said passages during a portion of the time said first material is being injected wherein said second material forms an intermediate layer between said two layers of said primary material in a selected portion of said preform, the injection of said primary material being stopped but occurring at both a start and an end of the injection, injection of said primary material being through said surrounding passage and injection of said second material being through said central passage.

27. A method according to claim 26 wherein the second material appears in the preform as inner and outer intermediate layers between inner and outer layers of said primary material, and a second injected primary material forms a core layer between said inner and outer intermediate layers.

28. A method according to claim 27 wherein the material flow is such that said inner intermediate layer is of a greater thickness than said outer intermediate layer.

29. A method according to claim 27 wherein there is a second surrounding passage surrounding the first mentioned surrounding passage, and the secondary material is delivered to a preform mold cavity through both said central passage and said second surrounding passage.

30. A method according to claim 29 wherein said second material forms an intermediate layer portion, and certain of said primary material forms a core within said intermediate layer.

31. A method according to claim 30 wherein timing of material flow into the cavity results in centering of all layers.

* * * * *

UNITED STATES PATENT AND TRADEMARK OFFICE
CERTIFICATE OF CORRECTION

PATENT NO. : 4,990,301
DATED : February 5, 1991
INVENTOR(S) : Krishnakumar et al.

It is certified that error appears in the above-indentified patent and that said Letters Patent is hereby corrected as shown below:

Col. 9, Table 1 - in column headings after "1" insert --*-- as shown below:

TABLE 1

| Layer Structure | Layer Thickness (mils) | | | | |
|---|---|---|---|---|---|
| | 1* | 2 | 3 | 4 | 5 |
| FIG. 2-2M3L | 20–40 | 5–30 | 80–125 | | |
| FIG. 3-2M3L | 80–125 | 5–30 | 20–40 | | |
| FIG. 4-2M3L | 60–70 | 5–30 | 60–70 | | |
| FIG. 5-2M5L | 20–40 | 5–30 | 30–105 | 1–10 | 20–40 |
| FIG. 6-2M5L | 20–40 | 1–10 | 30–105 | 5–30 | 20–40 |
| FIG. 7-2M3L | 20–40 | 5–30 | 30–90 | 5–30 | 20–40 |
| FIG. 8-3M4L | 20–40 | 5–30 | 30–105 | 20–60 | |
| FIG. 9-3M4L | 20–60 | 30–105 | 5–30 | 20–40 | |
| FIG. 10-3M5L | 20–40 | 5–30 | 30–105 | 1–10 | 20–40 |
| FIG. 11-3M5L | 20–40 | 1–10 | 30–105 | 5–30 | 20–40 |
| FIG. 12-3M5L | 20–40 | 5–30 | 30–105 | 5–30 | 20–40 |

*Outside layer of preform

Signed and Sealed this

Fifteenth Day of February, 1994

Attest:

BRUCE LEHMAN

Attesting Officer  Commissioner of Patents and Trademarks